(12) United States Patent
Fujimoto

(10) Patent No.: US 12,509,121 B2
(45) Date of Patent: Dec. 30, 2025

(54) AUTONOMOUS TRAVEL CONTROL SYSTEM, AUTONOMOUS TRAVEL CONTROL DEVICE, AUTONOMOUS TRAVEL DEVICE, AUTONOMOUS TRAVEL CONTROL METHOD, AND NON-TRANSITORY COMPUTER READABLE MEDIUM

(71) Applicant: DENSO CORPORATION, Kariya (JP)

(72) Inventor: Keigo Fujimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 73 days.

(21) Appl. No.: 18/637,662

(22) Filed: Apr. 17, 2024

(65) Prior Publication Data

US 2025/0296601 A1    Sep. 25, 2025

Related U.S. Application Data

(63) Continuation of application No. PCT/JP2022/038020, filed on Oct. 12, 2022.

(30) Foreign Application Priority Data

Oct. 19, 2021 (JP) ................. 2021-171204

(51) Int. Cl.
*B60W 60/00* (2020.01)
*B60W 50/08* (2020.01)
*B60W 50/14* (2020.01)

(52) U.S. Cl.
CPC .... *B60W 60/00256* (2020.02); *B60W 50/082* (2013.01); *B60W 50/14* (2013.01); *B60W 60/005* (2020.02); *B60W 2556/45* (2020.02)

(58) Field of Classification Search
CPC ......... B60W 60/00256; B60W 60/005; B60W 50/082; B60W 50/14; B60W 2556/45
See application file for complete search history.

(56) References Cited

U.S. PATENT DOCUMENTS

2013/0060432 A1    3/2013  Take et al.
2016/0196612 A1*   7/2016  Hagelstein ............ G06F 3/0481
                                                      705/4

(Continued)

FOREIGN PATENT DOCUMENTS

WO    2023068130 A1    4/2023
WO    2023068132 A1    4/2023

*Primary Examiner* — Naeem Taslim Alam
(74) *Attorney, Agent, or Firm* — Maschoff Brennan

(57) ABSTRACT

A technic controls an autonomous travel device capable of communicating with a center and executing autonomous traveling. In the technic, It is determined whether to permit switching of control modes including an autonomous travel mode, a stop mode, and a user operation mode. An external abnormality that occurs outside the autonomous travel device is detected. The determination of whether to permit the switching includes permitting the switching from the stop mode to the user operation mode in response to acquisition of a permission regarding the switching from the stop mode to the user operation mode from the center when the external abnormality is not detected. The determination of whether to permit the switching includes permitting the switching from the stop mode to the user operation mode regardless of the acquisition of the permission when the external abnormality is detected.

8 Claims, 11 Drawing Sheets

(56) References Cited

U.S. PATENT DOCUMENTS

| | | | |
|---|---|---|---|
| 2016/0229404 A1* | 8/2016 | Byun | H04W 4/44 |
| 2019/0212731 A1* | 7/2019 | Flynn | B60W 40/09 |
| 2019/0220007 A1* | 7/2019 | Konishi | G05D 1/0088 |
| 2020/0009970 A1* | 1/2020 | Yi | B60L 58/12 |
| 2021/0016603 A1 | 1/2021 | Mori et al. | |
| 2022/0203942 A1* | 6/2022 | Aurand | B60T 7/12 |

* cited by examiner

AUTONOMOUS TRAVEL CONTROL SYSTEM, AUTONOMOUS TRAVEL CONTROL DEVICE, AUTONOMOUS TRAVEL DEVICE, AUTONOMOUS TRAVEL CONTROL METHOD, AND NON-TRANSITORY COMPUTER READABLE MEDIUM

CROSS REFERENCE TO RELATED APPLICATIONS

The present application is a continuation application of International Patent Application No. PCT/JP2022/038020 filed on Oct. 12, 2022, which designated the U.S. and claims the benefit of priority from Japanese Patent Application No. 2021-171204 filed on Oct. 19, 2021. The entire disclosures of all of the above applications are incorporated herein by reference.

TECHNICAL FIELD

The present disclosure relates to a technique for controlling an autonomous travel device capable of executing autonomous traveling.

BACKGROUND

A traveling carriage is self-propelled with a motor. The traveling carriage executes a self-traveling operation in which the traveling carriage self-travels by rotationally driving drive wheels with a motor, and a manual operation in which the traveling carriage can be operated by an external force by releasing brakes of the drive wheels.

SUMMARY

According to an aspect of the present disclosure, a technique for controlling an autonomous travel device is used. The autonomous travel device is capable of communicating with a center and executing autonomous traveling. In the technique, an autonomous travel mode is executed, in which the autonomous traveling of the autonomous travel device is executed. A stop mode is executed, in which movement of the autonomous travel device is restricted. A user operation mode is executed, in which restriction of movement of the autonomous travel device is released and a movement operation of the autonomous travel device by a user is accepted. It is determined whether to permit switching of control modes including the autonomous travel mode, the stop mode and the user operation mode. An external abnormality that occurs outside the autonomous travel device is detected. In the determining whether to permit the switching of the control modes, Switching from the stop mode to the user operation mode is permitted in response to acquisition of a permission regarding the switching from the stop mode to the user operation mode from the center when the external abnormality is not detected. Switching from the stop mode to the user operation mode is permitted regardless of the acquisition of the permission from the center when the external abnormality is detected.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
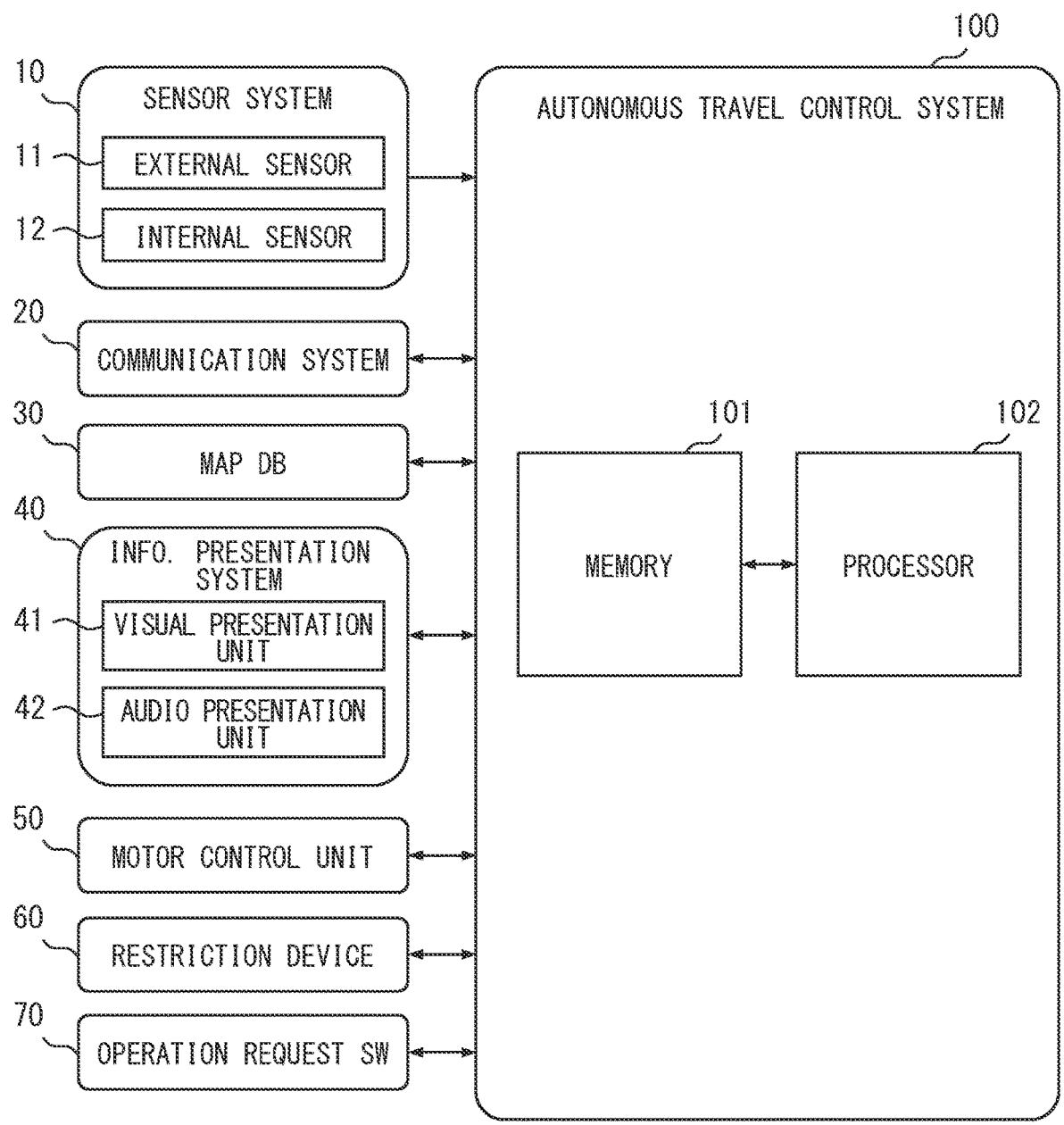
FIG. 1 is a block diagram illustrating an overall configuration according to a first embodiment.

To begin with, examples of relevant techniques will be described. According to a comparative example, a traveling carriage is self-propelled with a motor. The traveling carriage executes a self-traveling operation in which the traveling carriage self-travels by rotationally driving drive wheels with a motor, and a manual operation in which the traveling carriage can be operated by an external force by releasing brakes of the drive wheels.

In a situation of relatively low urgency, it may be desirable to avoid leaving a start of a moving operation by a user of the autonomous travel device only to the determination of the user. On the other hand, in a situation of relatively high urgency, it may be desirable that the moving operation by the user can be quickly started. In the comparative example, the movement operation by the user may be not appropriately enabled according to a situation.

In contrast, according to the present disclosure, an autonomous travel control system is capable of appropriately enabling a moving operation by a user according to a situation. An autonomous travel control device is capable of appropriately enabling a moving operation by a user according to a situation. An autonomous travel device is capable of appropriately enabling a moving operation by a user according to a situation. An autonomous travel control method is capable of appropriately enabling a moving operation by a user according to a situation. A non-transitory tangible storage medium storing autonomous travel control program is capable of appropriately enabling a moving operation by a user according to a situation.

According to a first aspect of the present disclosure, an autonomous travel control system for controlling an autonomous travel device, the autonomous travel device being capable of communicating with a center and executing autonomous traveling, the autonomous travel control system comprising a processor, wherein
 the processor is configured to carry out
  executing an autonomous travel mode in which the autonomous traveling of the autonomous travel device is executed,
  executing a stop mode in which movement of the autonomous travel device is restricted,
  executing a user operation mode in which restriction of movement of the autonomous travel device is released and a movement operation of the autonomous travel device by a user is accepted,
  determining whether to permit switching of control modes including the autonomous travel mode, the stop mode and the user operation mode, and
  detecting an external abnormality that occurs outside the autonomous travel device, and
 the determining whether to permit the switching of the control modes includes
  permitting switching from the stop mode to the user operation mode in response to acquisition of a permission regarding the switching from the stop mode to the user operation mode from the center when the external abnormality is not detected, and
  permitting switching from the stop mode to the user operation mode regardless of the acquisition of the permission from the center when the external abnormality is detected.

According to a second aspect of the present disclosure, an autonomous travel control device for controlling an autonomous travel device, the autonomous travel device being capable of communicating with a center and executing autonomous traveling, the autonomous travel control system comprising a processor, wherein
 the processor is configured to carry out
  executing an autonomous travel mode in which the autonomous traveling of the autonomous travel device is executed,
  executing a stop mode in which movement of the autonomous travel device is restricted,
  executing a user operation mode in which restriction of movement of the autonomous travel device is released and a movement operation of the autonomous travel device by a user is accepted,
  determining whether to permit switching of control modes including the autonomous travel mode, the stop mode and the user operation mode, and
  detecting an external abnormality that occurs outside the autonomous travel device, and
 the determining whether to permit the switching of the control modes includes
  permitting switching from the stop mode to the user operation mode in response to acquisition of a permission regarding the switching from the stop mode to the user operation mode from the center when the external abnormality is not detected, and
  permitting switching from the stop mode to the user operation mode regardless of the acquisition of the permission from the center when the external abnormality is detected.

According to a third aspect of the present disclosure, an autonomous travel device capable of communicating with a center and executing autonomous traveling, the autonomous travel device comprising a processor, wherein
 the processor is configured to carry out
  executing an autonomous travel mode in which the autonomous traveling of the autonomous travel device is executed,
  executing a stop mode in which movement of the autonomous travel device is restricted,
  executing a user operation mode in which restriction of movement of the autonomous travel device is released and a movement operation of the autonomous travel device by a user is accepted,
  determining whether to permit switching of control modes including the autonomous travel mode, the stop mode and the user operation mode, and
  detecting an external abnormality that occurs outside the autonomous travel device, and
 the determining whether to permit the switching of the control modes includes
  permitting switching from the stop mode to the user operation mode in response to acquisition of a permission regarding the switching from the stop mode to the user operation mode from the center when the external abnormality is not detected, and
  permitting switching from the stop mode to the user operation mode regardless of the acquisition of the permission from the center when the external abnormality is detected.

According to a fourth aspect of the present disclosure, an autonomous travel control method executed by a processor for controlling an autonomous travel device, the autonomous travel device being capable of communicating with a center and executing autonomous traveling, the method comprising:
 executing an autonomous travel mode in which the autonomous traveling of the autonomous travel device is executed;
 executing a stop mode in which movement of the autonomous travel device is restricted;
 executing a user operation mode in which restriction of movement of the autonomous travel device is released and a movement operation of the autonomous travel device by a user is accepted;
 determining whether to permit switching of control modes including the autonomous travel mode, the stop mode and the user operation mode; and
 detecting an external abnormality that occurs outside the autonomous travel device, wherein
 the determining whether to permit the switching of the control modes includes
  permitting switching from the stop mode to the user operation mode in response to acquisition of a permission regarding the switching from the stop mode to the user operation mode from the center when the external abnormality is not detected, and permitting switching from the stop mode to the user operation mode regardless of the acquisition of the permission from the center when the external abnormality is detected.

According to a fifth aspect of the present disclosure, an autonomous travel control program stored in a storage medium and including instructions to be executed by a processor for controlling an autonomous travel device, the autonomous travel device being capable of communicating with a center and executing autonomous traveling, the instructions, when executed by the processor, causing the processor to carry out:

executing an autonomous travel mode in which the autonomous traveling of the autonomous travel device is executed;

executing a stop mode in which movement of the autonomous travel device is restricted;

executing a user operation mode in which restriction of movement of the autonomous travel device is released and a movement operation of the autonomous travel device by a user is accepted;

determining whether to permit switching of control modes including the autonomous travel mode, the stop mode and the user operation mode; and detecting an external abnormality that occurs outside the autonomous travel device, wherein the determining whether to permit the switching of the control modes includes permitting switching from the stop mode to the user operation mode in response to acquisition of a permission regarding the switching from the stop mode to the user operation mode from the center when the external abnormality is not detected, and permitting switching from the stop mode to the user operation mode regardless of the acquisition of the permission from the center when the external abnormality is detected.

According to the first to fifth aspects, when the external abnormality is not detected and urgency is relatively low, and the permission from the center 200 has been acquired, the switching from the stop mode to the user operation mode is permitted. Therefore, it is possible to avoid leaving execution of the user operation mode only to the user's determination. When the external abnormality is detected and the urgency is relatively high, the permission from the center may be unnecessary for switching from the stop mode to the user operation mode. Therefore, the user operation mode can be quickly started. Therefore, it is possible to appropriately execute a movement operation by the user according to the situation.

Hereinafter, embodiments of the present disclosure will be described with reference to the drawings. Elements corresponding to each other among the embodiments are assigned the same numeral and their descriptions may be omitted. When only a part of a component is described in an embodiment, the other part of the component can be relied on the component of a preceding embodiment. Furthermore, in addition to the combination of components explicitly described in each embodiment, it is also possible to combine components from different embodiments, as long as the combination poses no difficulty, even if not explicitly described.

Hereinafter, various embodiments of the present disclosure will be described with reference to the drawings.

First Embodiment

Figure 2:
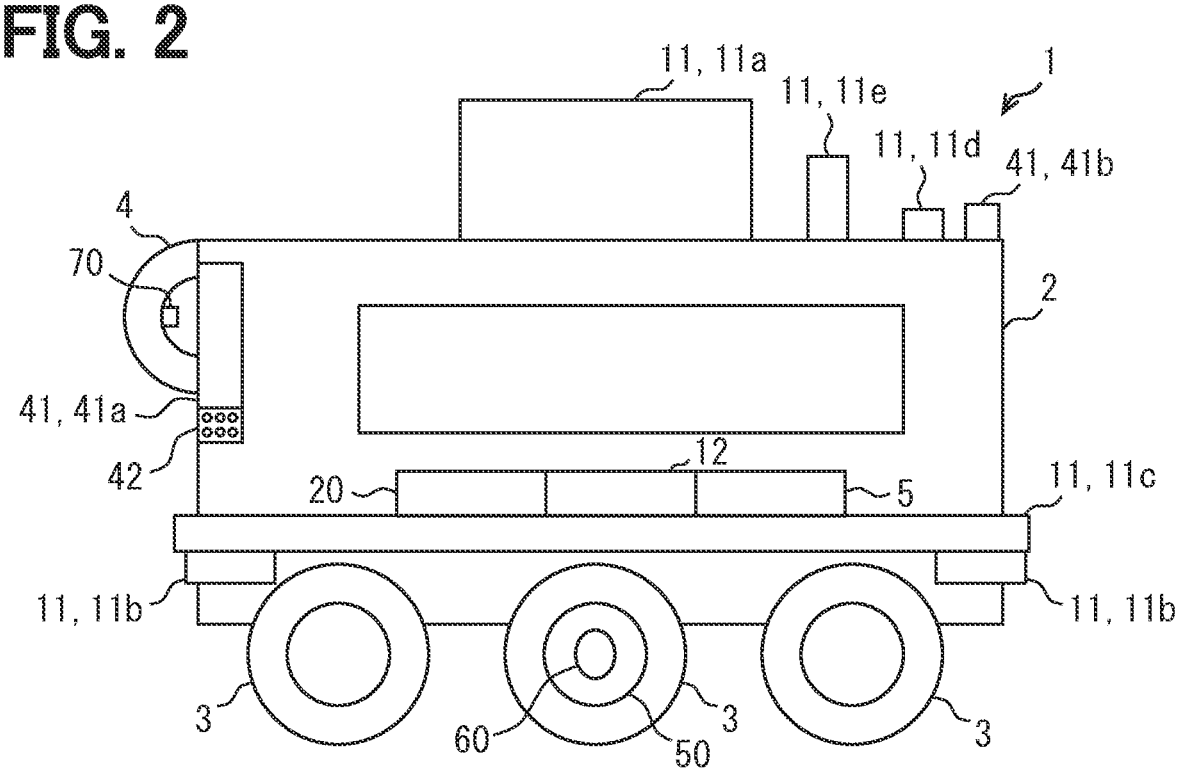
FIG. 2 is a schematic diagram illustrating an autonomous travel device according to the first embodiment.

The autonomous travel control system 100 of a first embodiment illustrated in FIG. 1 controls traveling of the autonomous travel device 1 illustrated in FIG. 2. The autonomous travel device 1 is, for example, a delivery robot that travels on a road to deliver a package. The operation of the autonomous travel device 1 is managed via communications with an external center 200. The autonomous travel device 1 may be a distribution robot that transports a package in a warehouse that stores the package.

The autonomous travel device 1 includes a vehicle body 2 having a space capable of storing packages therein, and multiple drive wheels 3 attached to the vehicle body 2. In addition, the vehicle body 2 is provided with a grip portion 4. The grip portion 4 is positioned, for example, at a rear portion of the vehicle body 2. The grip portion 4 is a grip to be gripped by a user who moves the autonomous travel device 1. The autonomous travel device 1 is a traveling body that travels using a driving source which is a battery 5 built in the vehicle body 2.

Figure 3:
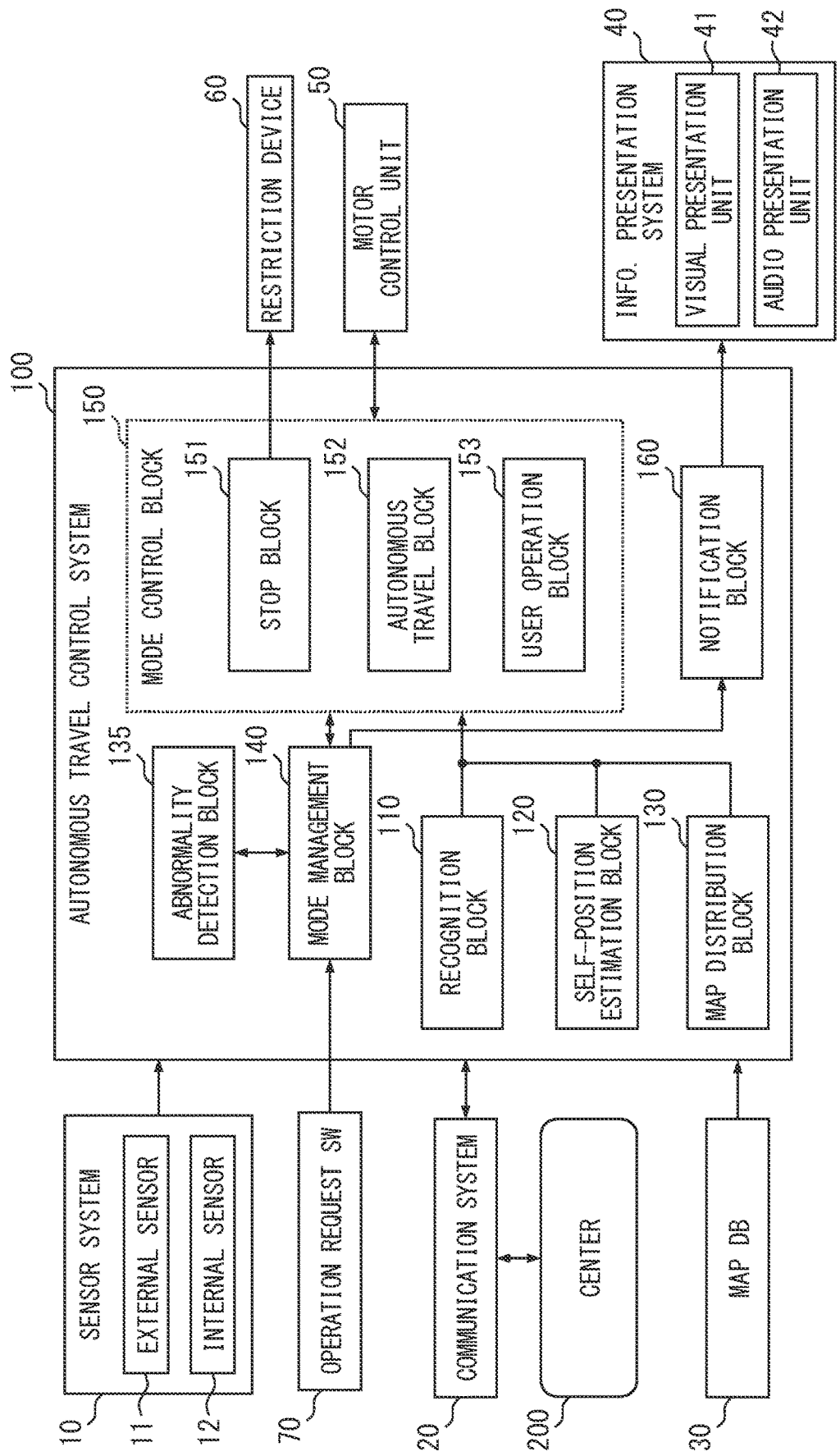
FIG. 3 is a block diagram illustrating a functional configuration of an autonomous travel control system according to the first embodiment.

The autonomous travel device 1 includes a sensor system 10, a communication system 20, a map database (hereinafter, referred to as "DB") 30, an information presentation system 40, a motor control unit 50, a restriction device 60, and an operation request switch 70, which are illustrated in FIG. 3. The sensor system 10 acquires sensor information that is available by the autonomous travel control system 100 by detecting the external environment and internal environment of the autonomous travel device 1. For this purpose, the sensor system 10 includes an external sensor 11 and an internal sensor 12.

The external sensor 11 acquires external environment information that is available by the autonomous travel control system 100 from the external environment that is the surrounding environment of the autonomous travel device 1. The external sensor 11 may acquire the external environment information by detecting an object present outside the autonomous travel device 1. The external sensor 11 which detects the object includes, for example, an optical sensor 11a such as a camera and a LIDAR (Light Detection and Ranging/Laser Imaging Detection and Ranging), and a sonar 11b. The external sensor 11 which detects the object may include a radar. The external sensor 11 may include a contact sensor 11c that detects contact with an object nearby the autonomous travel device 1.

The external sensor 11 may acquire the external information by monitoring a state of the external environment. The external sensor 11 which monitors the environment is an environment sensor 11e including at least one of a temperature sensor, a thermal camera, a wind force sensor, and a flood detection sensor.

The external sensor 11 may include a positioning type sensor that acquires external environment information by receiving a positioning signal from an artificial satellite of a global navigation satellite system (GNSS) present outside the autonomous travel device 1. The external sensor 11 of the positioning type is, for example, a GNSS receiver 11d or the like.

The internal sensor 12 acquires internal information that is available by the autonomous travel control system 100 from the internal environment of the autonomous travel device 1. The internal sensor 12 may acquire the internal information by detecting a specific physical quantity of motion inside the autonomous travel device 1. The physical quantity detection type internal sensor 12 is at least one type of, for example, a travelling speed sensor, an acceleration sensor, a gyro sensor, and the like.

The communication system 20 acquires communication information available by the autonomous travel control system 100 through wireless communications. The communication system 20 may transmit and receive a communication signal to and from a V2X system existing outside the autonomous travel device 1. The V2X type communication system 20 is at least one type of, for example, a dedicated short range communications (i.e., DSRC) communication device, a cellular V2X (i.e., C-V2X) communication device, and the like. The V2X type communication system 20 may be a sensor that acquires external information via communications. The communication system 20 may transmit and receive a communication signal to and from a terminal existing inside the autonomous travel device 1. The terminal communication type communication system 20 is, for example, at least one of Bluetooth (registered trademark) equipment, Wi-Fi (registered trademark) equipment, infrared communication equipment, and the like.

The map DB 30 stores map information available by the autonomous travel control system 100. The map DB 30 includes at least one type of non-transitory tangible storage mediums, such as a semiconductor memory, a magnetic medium, an optical medium, and the like. The map DB 30 may be a database for locators that estimate self-state quantities including a self-position of the autonomous travel device 1. The map DB 30 may be a database for a navigation unit that navigates the autonomous travel device 1 along a traveling route. The map DB 30 may be a combination of such databases.

The map DB 30 acquires and stores latest map information via, for example, communications between the external center 200 and the V2X type communication system 20. The map information is converted into two-dimensional or three-dimensional data as information indicating the traveling environment of the autonomous travel device 1. Digital data of a high definition map may be adopted as the three-dimensional map data. The map information may include road information indicating at least one of a position, a shape and a surface condition of a road, for example. The map information may include marking information indicating at least one of a traffic sign, a lane mark position and a lane mark shape associated with a road, for example. The map information may include structure information indicating at least one of positions and shapes of a building and a traffic light along a road.

The information presentation system 40 presents notification information to a nearby person around the autonomous travel device 1. The information presentation system 40 may be a visual presentation unit 41 that presents notification information by stimulating the visual sense of the nearby person. The visual presentation unit 41 may include, for example, a monitor device 41a that stimulates vision by displaying a video or an image, and a light emitting unit 41b that stimulates vision by light emission of a lamp. The monitor device 41a is provided, for example, at a rear portion of the vehicle body 2, and presents notification information to a nearby person behind the autonomous travel device 1. The monitor device 41a may allow the nearby person to input information through a touch panel, an operation button, or the like. For example, the monitor device 41a may be capable of receiving an input of an inquiry to the center 200 regarding transition to a user operation mode, which is described later.

The information presentation system 40 may be an audio presentation unit 42 that presents notification information by stimulating the auditory sense of the nearby person. The audio presentation unit 42 is, for example, at least one of a speaker, a buzzer, and a vibration unit.

The information presentation system 40 may include a tactile sense presentation unit that presents the notification information by stimulating a cutaneous sense of the nearby person. The cutaneous sense stimulated by the tactile sense presentation unit includes, for example, at least one of a tactile sense, a temperature sense, a wind sense, and the like. The tactile sense presentation unit is, for example, a vibration unit incorporated in the grip portion 4.

The motor control unit 50 is a control unit that controls a drive motor that rotationally drives the drive wheels 3. The motor control unit 50 is provided for each of the left and right drive wheels 3, and controls energization to the drive motor based on a control command (i.e., current command value) from the autonomous travel control system 100.

The restriction device 60 is a device that restricts movement of the autonomous travel device 1 caused by an external force. The restriction device 60 includes a so-called mechanical lock mechanism that mechanically restricts the rotation of the drive wheels 3. For example, the restriction device 60 may be an electromagnetic brake.

The operation request switch 70 is a switch for requesting switching to the user operation mode from a stop mode of the autonomous travel device 1 that is in a stopped state due to the stop mode. For example, the operation request switch 70 is provided on the grip portion 4. When the operation request switch 70 is operated by an arbitrary operator (user) among nearby persons, a request for operation of the autonomous travel device 1 in the user operation mode is output to the autonomous travel control system 100. The operation request switch 70 may be, for example, a push button switch. Alternatively, the operation request switch 70 may be a toggle switch or a rocker switch.

The autonomous travel control system 100 is connected to the sensor system 10, the communication system 20, the map DB 30, the information presentation system 40, the motor control unit 50, the restriction device 60, and the operation request switch 70 via at least one of, for example, a local area network (LAN) line, a wire harness, an internal bus, and a wireless communication line. The autonomous travel control system 100 includes at least one dedicated computer.

The dedicated computer constituting the autonomous travel control system 100 may be a driving control electronic control unit (ECU) that controls the driving of the autonomous travel device 1. The dedicated computer constituting the autonomous travel control system 100 may be a navigation ECU that navigates the autonomous travel device 1 along the traveling route. The dedicated computer constituting the autonomous travel control system 100 may be a locator ECU that estimates the self-state quantity of the autonomous travel device 1. The dedicated computer constituting the autonomous travel control system 100 may be an actuator ECU that controls traveling actuators of the autonomous travel device 1. The dedicated computer constituting the autonomous travel control system 100 may be an HCU which is a human machine interface (HMI) control unit that controls information presentation in the autonomous travel device 1. The dedicated computer constituting the autonomous travel control system 100 may be, for example, a computer outside the autonomous travel device 1. For example, the dedicated computer may be a computer that constitutes the center 200, a mobile terminal, or the like capable of communicating via the V2X type communication system 20.

The dedicated computer constituting the autonomous travel control system 100 includes at least one memory 101 and at least one processor 102. The memory 101 is at least one type of non-transitory tangible storage medium, which stores computer readable programs and data in non-transitory manner, such as a semiconductor memory, a magnetic medium, and an optical medium. The processor 102 includes a processing core as at least one type of, for example, a CPU (i.e., Central Processing Unit), a GPU (i.e., Graphics Processing Unit), a RISC (i.e., Reduced Instruction Set Computer)-CPU, a DFP (i.e., Data Flow Processor), and a GSP (i.e., Graph Streaming Processor).

In the autonomous travel control system 100, the processor 102 executes multiple commands included in an autonomous travel control program stored in the memory 101 in order to control the behavior of the autonomous travel device 1. Thus, the autonomous travel control system 100 has functional blocks for controlling the behavior of the autonomous travel device 1. As illustrated in FIG. 3, the functional blocks of the autonomous travel control system 100 include a recognition block 110, a self-position estimation block 120, a map distribution block 130, an abnormality detection block 135, a mode management block 140, a mode control block 150, and a notification block 160.

The recognition block 110 acquires detection information from multiple external sensors 11. The recognition block 110 integrates multiple pieces of detection information and recognizes information about a nearby object as nearby object information. The nearby object information includes, for example, the position and size of the nearby object.

The self-position estimation block 120 estimates a self-position of the autonomous travel device 1. For example, the self-position estimation block 120 may estimate the self-position based on positioning information from the GNSS receiver 11d. Alternatively, the self-position estimation block 120 may estimate the self-position by dead reckoning based on detection information of the internal sensor 12. Alternatively, the self-position estimation block 120 may estimate the self-position by matching the detection information of the external sensor 11 with the map information. Alternatively, the self-position estimation block 120 may estimate the self-position by combining the above-described methods of self-position estimation. The self-position estimation block 120 outputs the estimated self-position together with the traveling direction of the autonomous travel device 1 and the traveling speed of the autonomous travel device 1.

The map distribution block 130 extracts the map information about the surroundings of the autonomous travel device 1 from the map DB based on the estimated self-position.

The abnormality detection block 135 detects an external abnormality that is an abnormality occurred outside the autonomous travel device 1. For example, the external abnormality includes at least one of natural disasters such as flood, strong wind, and earthquake, and artificial disasters such as accidents and fires outside the autonomous travel device 1.

The mode management block 140 manages a control mode of the autonomous travel device 1. More specifically, the mode management block 140 determines whether to permit switching of the control mode among an autonomous travel mode, the stop mode, and the user operation mode, and switches the control mode.

The autonomous travel mode is a mode in which autonomous travel control is executed. In the autonomous travel mode, the drive motor is controlled to execute autonomous travel to a destination point given from the center 200.

The stop mode is a mode in which movement of the autonomous travel device 1 due to an external force is restricted. More specifically, in the stop mode, the stopped state at the stop point is maintained, and the restriction device 60 restricts the mechanical movement.

The user operation mode is a mode in which a movement operation by the user is accepted. Here, the user is one of nearby persons around the autonomous travel device 1 and a person who desires the autonomous travel device 1 to move. In the user operation mode, the locked state of the drive wheels 3 due to the restriction device 60 is released. In the user operation mode, the autonomous travel device 1 outputs a driving force according to a moving operation by the user. More specifically, in the user operation mode, the autonomous travel device 1 outputs a driving force corresponding to an external force applied to the autonomous travel device 1 by the user. That is, in the user operation mode, the autonomous travel device 1 outputs a driving force in a desired direction in accordance with an operation such as a user directly pushing or pulling the autonomous travel device 1 in the desired direction. The user operation mode is an example of an "external force operation mode".

The mode management block 140 manages the control mode of the autonomous travel device 1 by appropriately selecting a mode permitted in the autonomous travel device 1 among the above modes (details will be described later). Hereinafter, switching of the control mode may be referred to as transition of the control mode.

The mode control block 150 includes, as sub-blocks, a stop block 151 that executes the stop mode, an autonomous travel block 152 that executes the autonomous travel mode, and a user operation block 153 that executes the user operation mode.

The notification block 160 executes various notifications during operation of the autonomous travel device 1. The notification block 160 executes notification to a nearby person around the autonomous travel device 1 via the information presentation system 40. The notification block 160 executes notification to the center 200 via the V2X type communication system 20. Details of the notification executed by the notification block 160 will be described later.

An autonomous travel control flow, which is a flow of an autonomous travel control method in which the autonomous travel control system 100 controls the autonomous travel device 1 by cooperation of the multiple blocks 110, 120, 130, 135, 140, 150, and 160 described above, will be described below with reference to FIGS. 4 to 11. Note that each "S" in each processing flow described below means each of multiple steps executed by multiple commands included in the autonomous travel control program.

Figure 4:
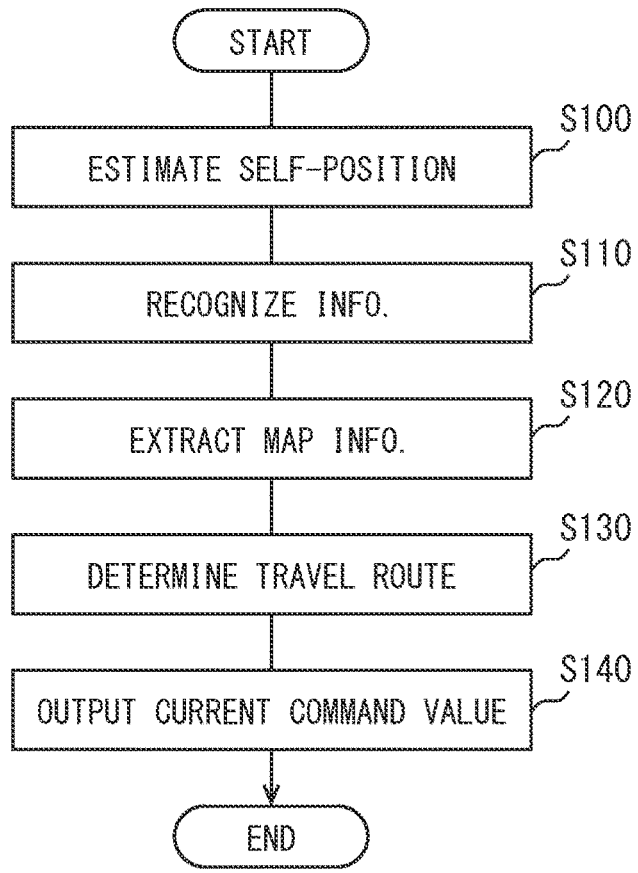
FIG. 4 is a flowchart illustrating processing of an autonomous travel mode in an autonomous travel control method according to the first embodiment.

First, a processing flow in the autonomous travel mode will be described with reference to FIG. 4. This flow is repeatedly executed during the autonomous travel mode. First, in S100, the self-position estimation block 120 estimates the self-position of the autonomous travel device 1. Next, in S110, the recognition block 110 recognizes the nearby object information by acquiring and integrating the detection information from the external sensors 11 (via sensor fusion). In subsequent S120, the map distribution block 130 extracts map information on the surroundings of the autonomous travel device 1 from the map DB 30 based on the estimated self-position.

In S130, the autonomous travel block 152 determines the traveling route based on the nearby object information, the self-position, the map information, and the destination point. In subsequent S140, the autonomous travel block 152 determines a current command value so as to execute traveling along the determined traveling route, and outputs the command value to the motor control unit 50. By repeating the above flow, the autonomous travel control system 100 executes autonomous travel to the destination point while sequentially updating the travel route.

Figure 5:
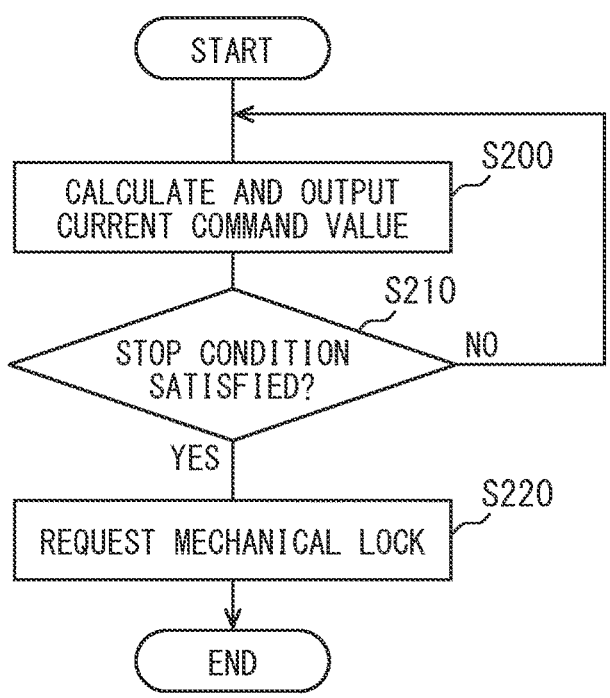
FIG. 5 is a flowchart illustrating processing of a stop mode in the autonomous travel control method according to the first embodiment.

Next, a processing flow in the stop mode will be described with reference to FIG. 5. This flow is started when the transition to the stop mode is permitted. When the stop mode is started, first, in S200, the stop block 151 calculates and outputs a current command value for continuing the stop at the stop position. For example, the current command value is calculated based on the equation (1). Note that C and k in the equation (1) are predetermined coefficients. The driving force output according to the current command value can reduce movement in a direction away from the stop point due to inertia or the like. Further, the driving force output according to the current command value can eliminate deviation between the stop position and the self-position.

$$\text{current command value} = -C \times \text{motor rotation speed} - k \times \text{distance to stop position} \quad \text{Equation (1)}$$

In subsequent S210, the stop block 151 determines whether a stop condition of the autonomous travel device 1 is satisfied. The stop condition is a condition for determining that the autonomous travel device 1 has stopped. For example, the stop condition is that a state in which the traveling speed is equal to or less than a threshold value (for example, 3 km/h) has continued for a predetermined time. When it is determined that the stop condition is not satisfied, the flow returns to S200.

On the other hand, when it is determined that the stop condition is satisfied, the flow proceeds to S220. In S220, the stop block 151 outputs a mechanical lock request to the restriction device 60. By the processing in the stop mode described above, the autonomous travel device 1 reliably stops at the stop position, and then the movement of the autonomous travel device 1 by the external force is restricted by the mechanical lock.

Figure 6:
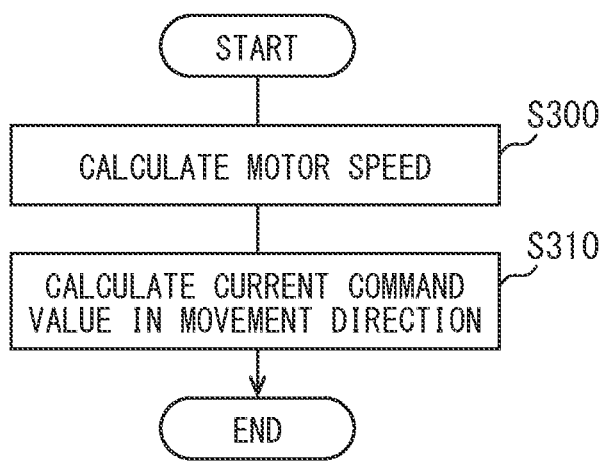
FIG. 6 is a flowchart illustrating processing of a user operation mode in the autonomous travel control method according to the first embodiment.

Next, a processing flow in the user operation mode will be described with reference to FIG. 6. This flow is started when the transition to the user operation mode is permitted. When the user operation mode is started, first, in S300, the user operation block 153 calculates a rotation speed of the drive motor of the drive wheels 3. For example, the user operation block 153 may calculate the rotation speed from the motor rotation speed detected by a rotation speed sensor installed in the drive motor. In subsequent S310, the user operation block 153 calculates and outputs a current command value (i.e., assist command value) in the movement direction by the external force according to the rotation speed.

A correspondence relationship between the assist command value and the rotation speed is defined in advance by a function, a table, or the like. The assist command value may be determined according to the gradient of the road surface in addition to the rotation speed. For example, the assist command value may further include a current command value for outputting a driving force in a direction against a component of gravity parallel to the road surface. By repeating the above flow, the autonomous travel control system 100 assists the user's operation in the user operation mode.

Figure 7:
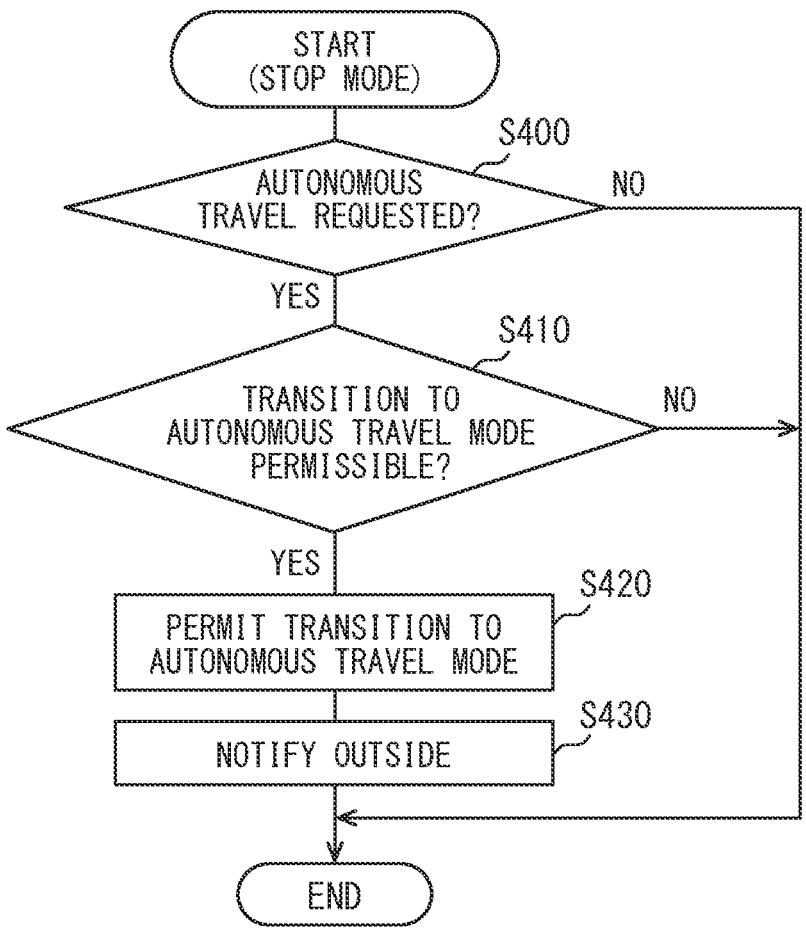
FIG. 7 is a flowchart illustrating processing of switching from the stop mode to the autonomous travel mode in the autonomous travel control method according to the first embodiment.

Next, a transition process from the stop mode to the autonomous travel mode will be described with reference to the flow of FIG. 7. The flow of FIG. 7 is started during the stop mode. First, in S400, the mode management block 140 determines whether an autonomous travel request has been acquired. The autonomous travel request is transmitted from the center 200 and acquired via the communication system 20. When it is determined that the autonomous travel request has not been acquired, this flow ends and the stop mode is continued. On the other hand, when it is determined that the autonomous travel request has acquired, the flow proceeds to S410.

In S410, the mode management block 140 determines whether transition to the autonomous travel mode can be permitted, that is, whether the transition is permissible. For example, the mode management block 140 may determine that the transition can be permitted when a stop condition in the stop mode is satisfied. Alternatively, the mode management block 140 may determine that the transition can be permitted when there is no external abnormality or the external abnormality is eliminated. Alternatively, the mode management block 140 may determine that the transition can be permitted when there is no obstacle that hinders traveling. When it is determined that the transition to the autonomous travel mode cannot be permitted, the present flow ends and the stop mode is continued. When it is determined that the transition can be permitted, the flow proceeds to S420.

In S420, the mode management block 140 provides the autonomous travel block 152 with permission to transition to the autonomous travel mode. In subsequent S430, the notification block 160 executes notification of a start of the autonomous travel mode to an outside. For example, the notification block 160 causes the audio presentation unit 42 to present a voice message for notification of the start of traveling and warning, such as "The vehicle will move, please be careful". The notification block 160 may visually present similar contents on the visual presentation unit 41. The notification block 160 may notify the center 200 of information on the transition to the autonomous travel mode. After the above processing is executed, the autonomous travel control in the autonomous travel mode is executed via the start of the processing flow of FIG. 4.

Figure 8:
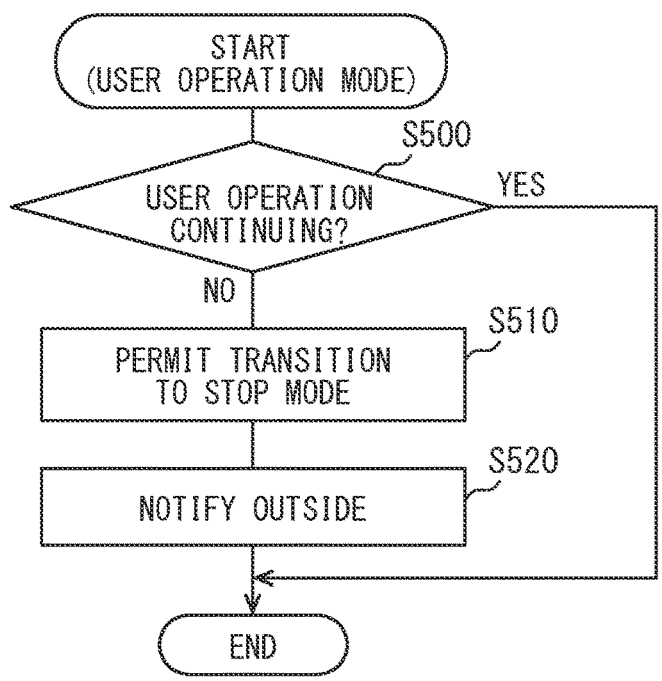
FIG. 8 is a flowchart illustrating processing of switching from the user operation mode to the stop mode in the autonomous travel control method according to the first embodiment.

Further, a transition process from the user operation mode to the stop mode will be described with reference to the flow of FIG. 8. First, in S500, the mode management block 140 determines whether the moving operation by the user is continuing in the user operation mode. For example, the mode management block 140 may determine that the moving operation is continuing when a predetermined time period has not elapsed in a state where the autonomous travel device 1 is not moved by an external force. Alternatively, the mode management block 140 may determine that the movement operation is continuing when the operation request switch 70 is turned on, i.e., in the ON state. When it is determined that the movement operation is continuing, the present flow ends, and the user operation mode is continued. On the other hand, when it is determined that the moving operation is interrupted, the flow proceeds to S510.

In S510, the mode management block 140 provides the user operation block 153 with permission to transition to the stop mode. In subsequent S520, the notification block 160 executes notification of a start of the stop mode to the outside. For example, the notification block 160 may execute the same notification as the notification in S640 described later. After the above processing is executed, the stop control in the stop mode is executed via the start of the processing flow of FIG. 5.

Figure 9:
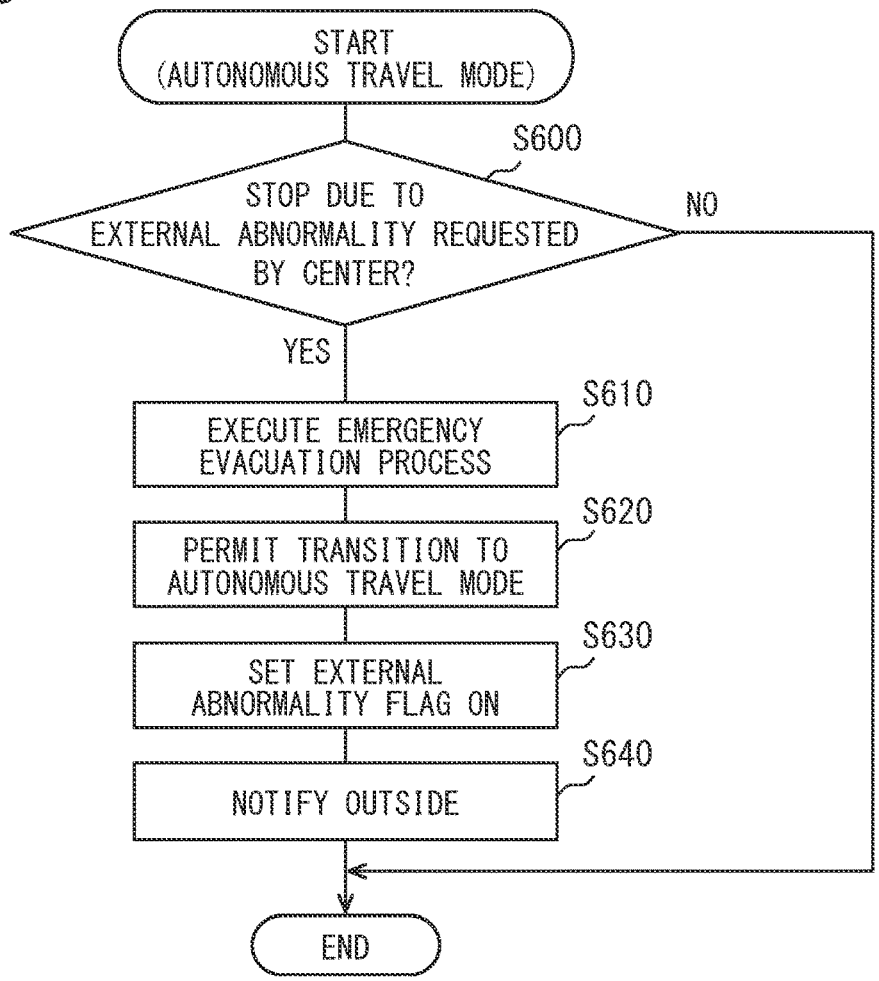
FIG. 9 is a flowchart illustrating processing of switching from the autonomous travel mode to the stop mode in the autonomous travel control method according to the first embodiment.
Figure 10:
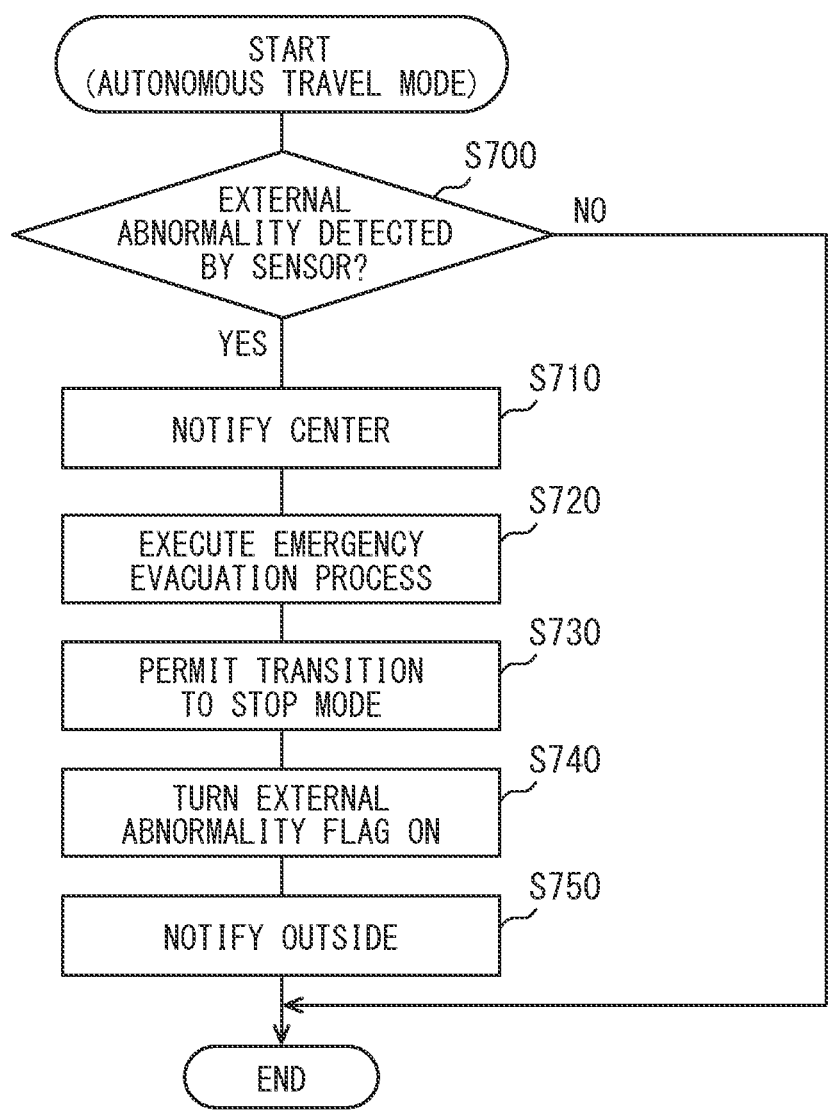
FIG. 10 is a flowchart illustrating processing of switching from the autonomous travel mode to the stop mode in the autonomous travel control method according to the first embodiment.

Next, a transition process from the autonomous travel mode to the stop mode when an external abnormality occurs will be described with reference to FIGS. 9 and 10. The respective flows of FIGS. 9 and 10 are repeatedly executed in parallel during the autonomous travel mode. In S600 of FIG. 9, the abnormality detection block 135 determines whether a stop request due to an external abnormality has been received from the center 200. When there is no stop request, this flow ends, and the autonomous travel mode is continued.

On the other hand, when it is determined that the stop request has been received, the flow proceeds to S610. In S610, the autonomous travel block 152 executes an emergency evacuation process via autonomous travel. Specifically, in the emergency evacuation process, the autonomous travel block 152 determines a stop point and executes the autonomous travel control such that the traveling speed becomes zero at the stop point. The emergency evacuation process can also be referred to as a preparation process for transition to the stopped state in which movement is restricted in the stop mode.

Figure 11:
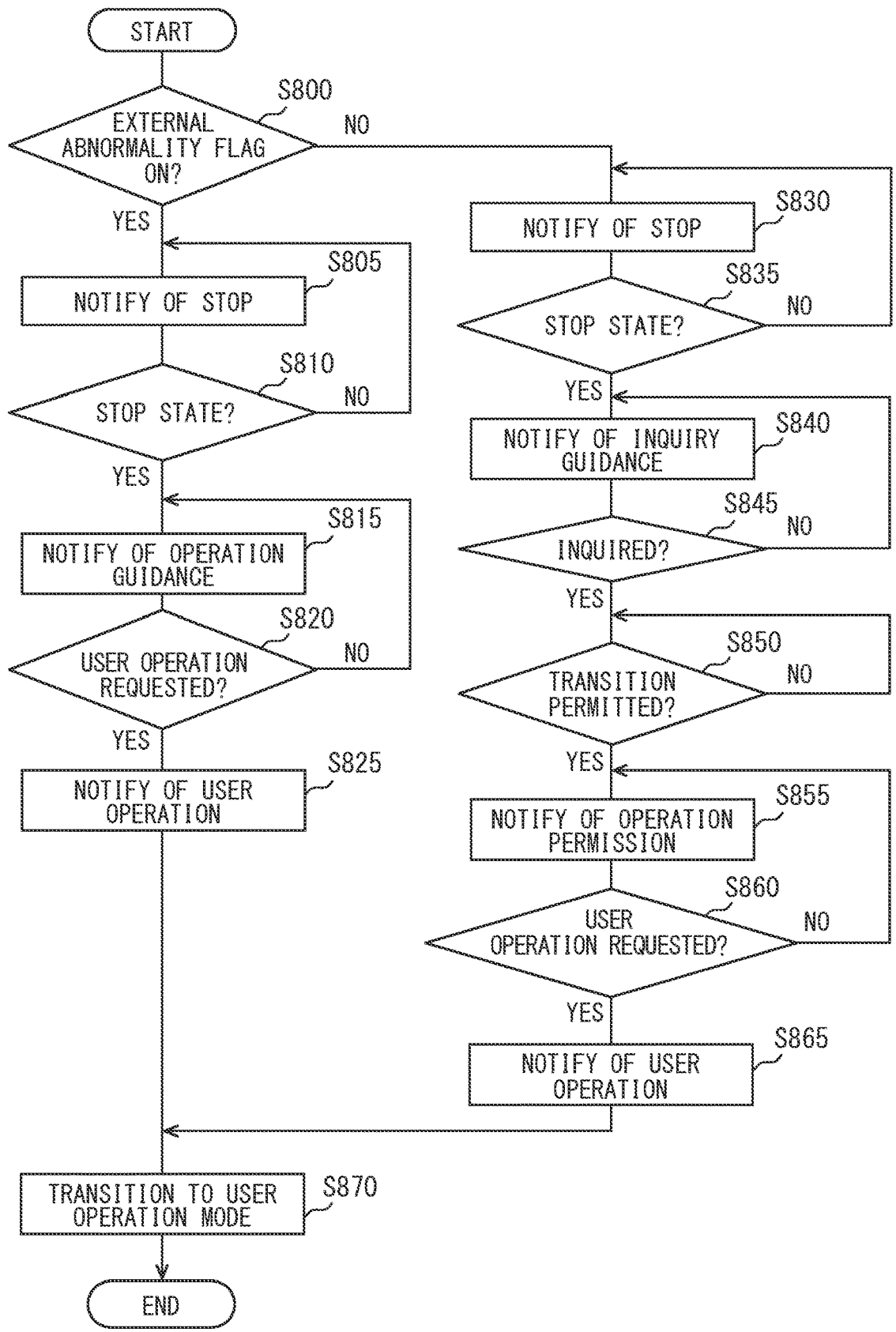
FIG. 11 is a flowchart illustrating processing of switching from the stop mode to the user operation mode in the autonomous travel control method according to the first embodiment.

Subsequently, in S620, the mode management block 140 provides the stop block 151 with permission to transition to the stop mode. Subsequently, in S630, the abnormality detection block 135 sets an external abnormality flag to ON. Next, in S640, the notification block 160 executes notification of information related to the transition to the stop mode to the outside. For example, the notification block 160 causes the audio presentation unit 42 to present a voice message for a stop notice and a warning about keeping a distance from the autonomous travel device 1, such as "The vehicle will stop, please move away". The notification block 160 may visually present similar contents on the visual presentation unit 41. The notification block 160 may notify the center 200 of information on the transition to the stop mode. After the above processing is executed, a processing flow of FIG. 11 is started.

In addition, in S700 of FIG. 10, the abnormality detection block 135 determines whether detection information has been acquired, i.e. whether an external abnormality is detected by the external sensor 11 or the communication system 20 which is a mounted sensor mounted on the autonomous travel device 1. For example, the detection information on the external abnormality includes at least one of imaging information of the external abnormality from a camera, detection information of an abnormal temperature from a thermometer or a thermal camera, detection information of a strong wind from an anemometer, detection information of flooding from a flooding sensor, and detection information of interruption in communication with the center 200 via the V2X type communication system 20. When the detection information of the external abnormality has not been acquired, the present flow is ended, and the autonomous travel mode is continued.

On the other hand, when it is determined that the external abnormality has been detected, the flow proceeds to S710. In S710, the notification block 160 notifies the center 200 of an occurrence of the external abnormality. The subsequent processes of S720, S730, S740 and S750 are the same as the processes of S610, S620, S630 and S640 of FIG. 9, respectively, and thus, the descriptions of FIG. 9 are incorporated.

Next, a transition process from the stop mode to the user operation mode will be described with reference to FIG. 11. The processing flow of FIG. 11 is executed during the stop mode. First, in S800, the mode management block 140 determines whether the external abnormality flag is ON or OFF. When it is determined that the external abnormality flag is ON, the process proceeds to S805. In S805, the notification block 160 executes stop notification for notifying the surroundings that the stop control is being executed in the stop mode. For example, the notification block 160 causes the audio presentation unit 42 to present a voice message for a notice of execution of the stop control and a warning about keeping a distance from the autonomous travel device 1, such as "Stop control is in progress, please move away". The notification block 160 may visually present similar contents on the visual presentation unit 41.

In subsequent S810, the mode management block 140 determines whether the autonomous travel device 1 is in the stopped state in which stoppage of the autonomous travel device 1 has been completed in the stop mode. For example, the mode management block 140 may determine that the autonomous travel device 1 is in the stopped state when the mechanical lock is activated. When it is determined that the device 1 is not in the stopped state, the flow returns to S805 and the stop notification is continued.

On the other hand, when it is determined that the device 1 is in the stopped state, the flow proceeds to S815. In S815, the notification block 160 executes an operation guidance notification for guiding the user to perform an operation for transition to the user operation mode. For example, the notification block 160 causes the audio presentation unit 42 to present a voice message for notification of a method of transition to the user operation mode, such as "Please press the operation switch if you want to move the vehicle". The notification block 160 may visually present similar contents on the visual presentation unit 41.

In subsequent S820, the mode management block 140 determines whether an operation request from the user has been acquired. For example, the mode management block 140 determines that the operation request has been acquired when the operation request switch 70 is turned on. When it is determined that the operation request has not been acquired, the flow returns to S815, and the operation guidance notification is continued.

On the other hand, when it is determined that the operation request has been acquired, the flow proceeds to S825. In S825, the notification block 160 executes user operation notification for notifying the transition to the user operation mode. For example, the notification block 160 causes the audio presentation unit 42 to present a voice message for notification of a start of movement and a warning, such as "The vehicle will move, please be careful". The notification block 160 may visually present similar contents on the visual presentation unit 41. In addition, the notification block 160 may executes the notification of an alert by light emission of the light emitting unit 41b. The notification block 160 notifies the center 200 of information on the transition to the user operation mode. In subsequent S870, the mode management block 140 permits transition to the user operation mode. When the process of S870 is completed, this flow ends, and the process of FIG. 6 starts.

When it is determined in S800 that the external abnormality flag is OFF, the flow proceeds to S830. In S830, the notification block 160 executes stop notification for notifying the surroundings that the stop control is being executed in the stop mode. In subsequent S835, the mode management block 140 determines whether the autonomous travel device 1 is in the stopped state in which stoppage of the autonomous travel device 1 has been completed in the stop mode. When it is determined that the device 1 is not in the stopped state, the flow returns to S830 and the stop notification is continued.

On the other hand, when it is determined that the device 1 is in the stopped state, the flow proceeds to S840. In S840, the notification block 160 executes an inquiry guidance notification for guiding the user to perform an inquiry operation to the center 200 for transition to the user operation mode. For example, the notification block 160 causes the audio presentation unit 42 to present a voice message such as "Please make an inquiry to the center if you want to move the vehicle". The notification block 160 may visually present similar contents on the visual presentation unit 41.

At S845, the notification block 160 determines whether the inquiry has been executed. When it is determined that the inquiry has not been executed, the flow returns to S840, and the inquiry guidance notification is continued. On the other hand, when it is determined that the inquiry is executed, the flow proceeds to S850.

In S850, the mode management block 140 determines whether a transition permission, which is a permission for switching from the stop mode to the user operation mode, has been acquired from the center 200. When it is determined that the transition permission has not been acquired, the process waits until the transition permission is acquired. When it is determined that the transition permission has been acquired, the flow proceeds to S855.

In S855, the notification block 160 executes an operation permission notification for notifying the user that the transition to the user operation mode has been permitted. For example, the notification block 160 causes the audio presentation unit 42 to present a voice message for notification that the transition permission has been acquired and notification of a method of transition to the user operation mode, such as "The operation has been permitted, please press the operation switch". The notification block 160 may visually present similar contents on the visual presentation unit 41.

In subsequent S860, the mode management block 140 determines whether an operation request from the user has been received. When it is determined that the operation request has not been received, the flow returns to S855, and the operation permission notification is continued.

On the other hand, when it is determined that the operation request has been received, the flow proceeds to S865. In S865, the notification block 160 executes user operation notification for notifying the transition to the user operation mode. When the process of S865 is executed, the flow proceeds to S870.

According to the first embodiment described above, when the external abnormality is not detected and the urgency is relatively low, and the permission from the center 200 is acquired, the switching from the stop mode to the user operation mode is permitted. Therefore, it is possible to avoid leaving execution of the user operation mode only to the user's determination. When the external abnormality is detected and the urgency is relatively high, the permission from the center 200 may be unnecessary for switching from the stop mode to the user operation mode. Therefore, the user operation mode can be quickly started. Therefore, it is possible to appropriately execute a movement operation by the user according to the situation.

According to the first embodiment, the detection of the external abnormality includes acquiring the notification related to an occurrence of the external abnormality from the center 200. Accordingly, it is possible to reliably detect an external abnormality based on the information from the center 200.

Further, according to the first embodiment, detecting the external abnormality includes acquiring the detection information of the external abnormality from the mounted sensor of the autonomous travel device 1. It is possible to reliably detect an external abnormality without depending on information from the center 200.

In addition, according to the first embodiment, the user is notified of information regarding switching from the stop mode to the user operation mode. Therefore, the user can appropriately grasp the state of the autonomous travel device 1.

Second Embodiment

Figure 12:
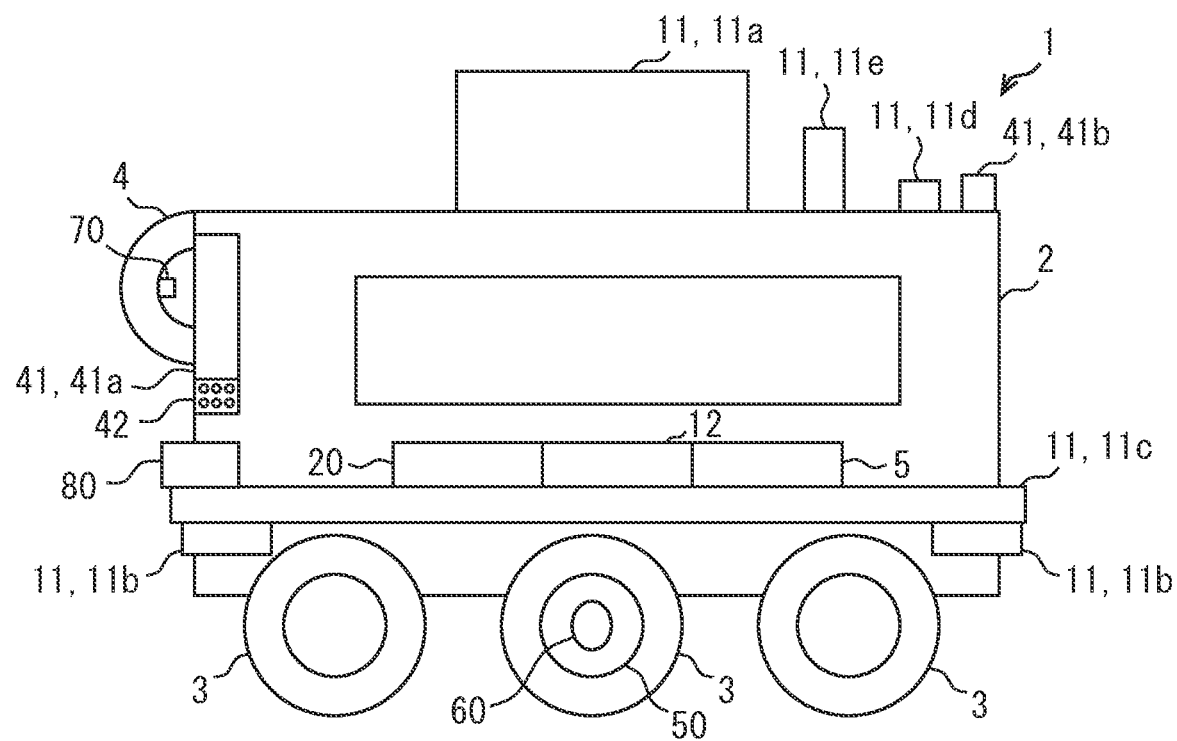
FIG. 12 is a schematic diagram illustrating an autonomous travel device according to a second embodiment.
Figure 13:
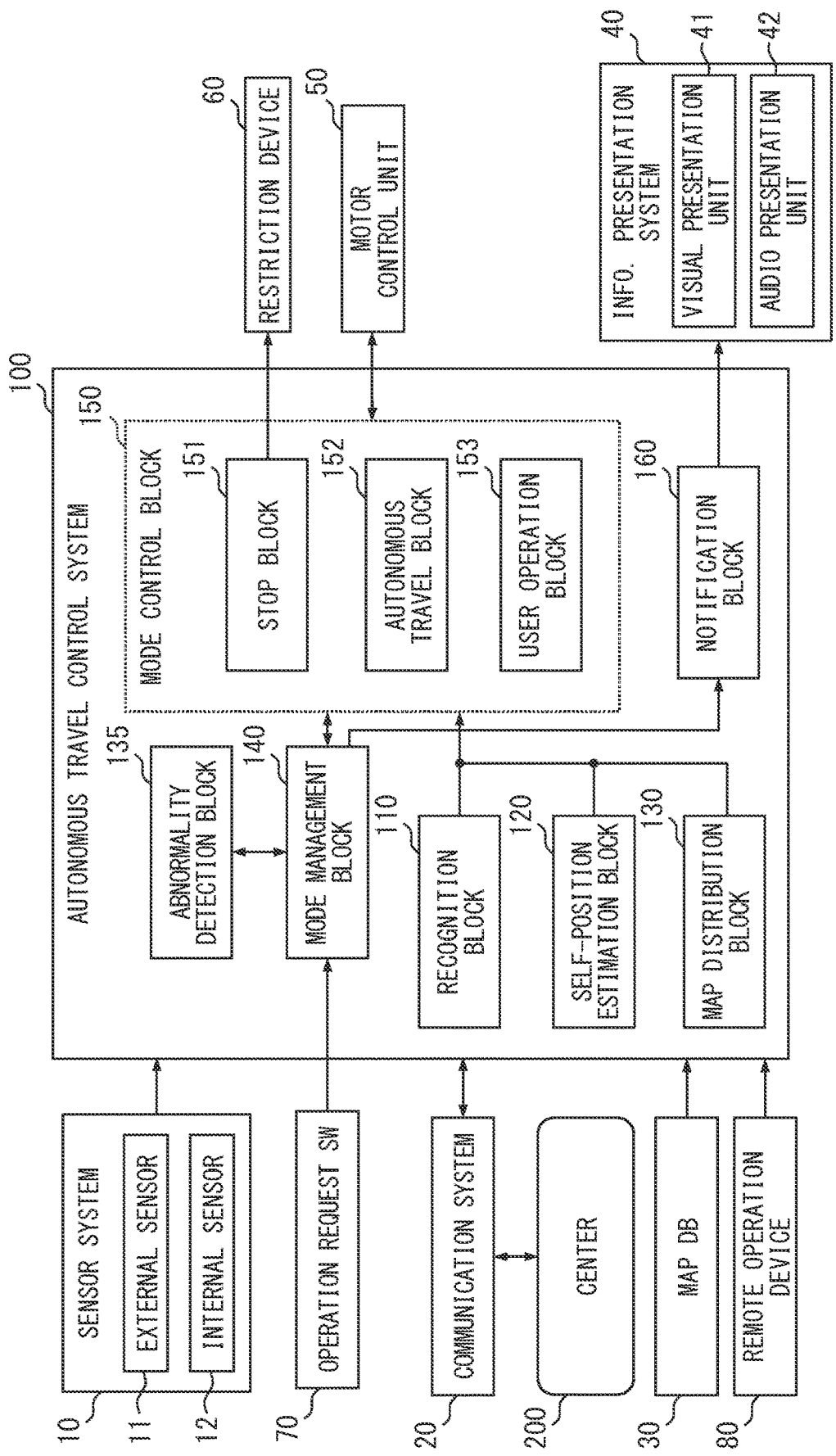
FIG. 13 is a block diagram illustrating a functional configuration of an autonomous travel control system according to the second embodiment.
Figure 14:
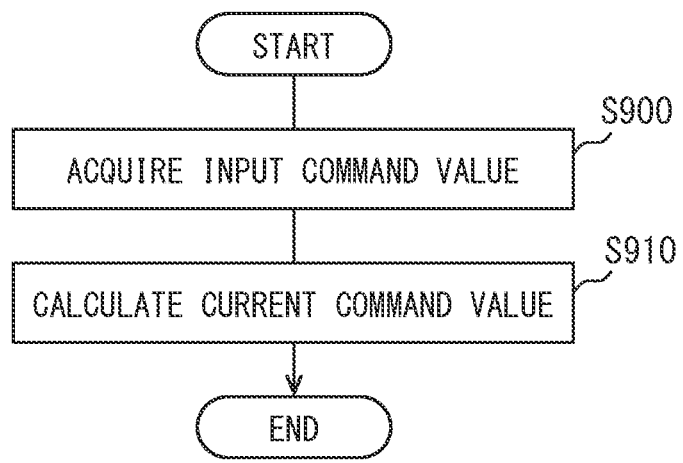
FIG. 14 is a flowchart illustrating processing of a user operation mode in the autonomous travel control method according to the second embodiment.

As shown in FIGS. 12 to 14, a second embodiment is a modification of the first embodiment.

In a user operation mode, a user operation block 153 in an autonomous travel control system 100 of the second embodiment outputs a driving force corresponding to a remote operation by a user. In the remote operation, the user inputs operation information to a remote operation device 80 illustrated in FIGS. 12 and 13.

The remote operation device 80 is a controller capable of receiving an input of a traveling speed, a traveling direction, and the like of an autonomous travel device 1. For example, as illustrated in FIG. 12, the remote operation device 80 is housed in a vehicle body 2 of the autonomous travel device 1 or is detachably attached thereto, and can be arbitrarily taken out by the user. The user operation mode in the second embodiment is an example of a "remote operation mode". The user operation block 153 may be capable of selectively executing either the external force operation mode or the remote operation mode as the user operation mode.

Next, a processing flow in the remote operation mode will be described with reference to FIG. 14. When the remote operation mode is started as the user operation mode, first, in S900, the user operation block 153 acquires an input command value input to the remote operation device 80 via the communication system 20. In subsequent S910, the user operation block 153 calculates and outputs a current command value corresponding to the input command value. By repeating the above flow, the autonomous travel control system 100 executes the traveling control of the autonomous travel device 1 based on the remote operation of the user.

Third Embodiment

Figure 15:
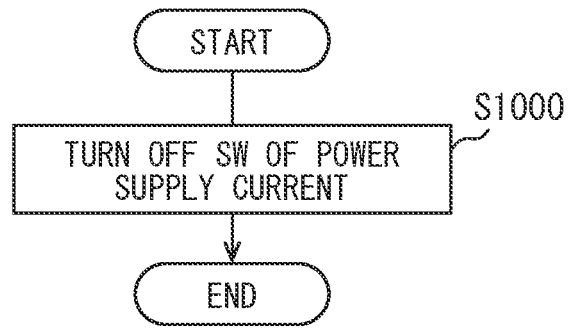
FIG. 15 is a flowchart illustrating processing of a user operation mode in an autonomous travel control method according to a third embodiment.

As shown in FIG. 15, a third embodiment is a modification of the first embodiment. A user operation block 153 in the third embodiment includes, in addition to at least one of the external force operation mode and the remote operation mode, the user operation mode includes a free mode in which a mechanical lock state of drive wheels 3 is released and a driving force is lost. The user operation block 153 can appropriately select a mode to be executed from the multiple sub-modes included in the user operation mode.

Next, a processing flow in the free mode will be described with reference to FIG. 15. When the free mode is started as the user operation mode, first, in S1000, the user operation block 153 sets a switch of a power supply current supplied to the drive motor to OFF. According to the above flow, the autonomous travel control system 100 eliminates the driving force while allowing the user's moving operation. Further, according to this flow, the flow of the regenerative current due to the counter electromotive force of the drive motor into the power supply can be blocked.

OTHER EMBODIMENTS

Although multiple embodiments have been described, the present disclosure should not be limited to the above embodiments and may be applied to various other embodiments within the scope of the present disclosure.

In a modification, when the autonomous travel device 1 approaches a point located away from a nearby object by an approachable distance, the user operation block 153 may cause the motor control unit 50 to output a resistance force that prevents the autonomous travel device 1 from approaching the point. The resistance force may be referred to as a repulsive force acting in a direction opposite to an approaching direction toward the nearby object.

In a modification, the dedicated computer constituting the autonomous travel control system 100 may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. The digital circuit may include a memory storing a program.

In addition to the embodiments described above, the autonomous travel control system 100 according to the above-described embodiments and modifications may be implemented as an autonomous travel control device that is a processing device (for example, a processing ECU) mounted on the autonomous travel device 1. In addition, the above-described embodiments and modifications may be implemented as a semiconductor device (for example, a semiconductor chip) including at least one processor 102 and at least one memory 101 of the autonomous travel control system 100.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An autonomous travel control system for controlling an autonomous travel device, the autonomous travel device being capable of communicating with a center and executing autonomous traveling, the autonomous travel control system comprising a processor, wherein
    the processor is configured to carry out
        executing an autonomous travel mode in which the autonomous traveling of the autonomous travel device is executed,
        executing a stop mode in which movement of the autonomous travel device is restricted,
        executing a user operation mode in which restriction of movement of the autonomous travel device is released and a movement operation of the autonomous travel device by a user is accepted,
        determining whether to permit switching of control modes including the autonomous travel mode, the stop mode and the user operation mode, and
        detecting an external abnormality that occurs outside the autonomous travel device, and
    the determining whether to permit the switching of the control modes includes
        permitting switching from the stop mode to the user operation mode in response to acquisition of a permission regarding the switching from the stop mode to the user operation mode from the center when the external abnormality is not detected, and
        permitting switching from the stop mode to the user operation mode regardless of the acquisition of the permission from the center when the external abnormality is detected.

2. The autonomous travel control system according to claim 1, wherein
    the detecting the external abnormality includes acquiring a notification related to an occurrence of the external abnormality from the center.

3. The autonomous travel control system according to claim 1, wherein
    the detecting the external abnormality includes acquiring detection information of the external abnormality from a sensor mounted on the autonomous travel device.

4. The autonomous travel control system according to claim 1, wherein
    the processor is further configured to carry out notifying the user of information regarding the switching from the stop mode to the user operation mode.

5. An autonomous travel control device for controlling an autonomous travel device, the autonomous travel device being capable of communicating with a center and executing autonomous traveling, the autonomous travel control device comprising a processor, wherein
    the processor is configured to carry out
        executing an autonomous travel mode in which the autonomous traveling of the autonomous travel device is executed,
        executing a stop mode in which movement of the autonomous travel device is restricted,
        executing a user operation mode in which restriction of movement of the autonomous travel device is released and a movement operation of the autonomous travel device by a user is accepted,
        determining whether to permit switching of control modes including the autonomous travel mode, the stop mode and the user operation mode, and
        detecting an external abnormality that occurs outside the autonomous travel device, and
    the determining whether to permit the switching of the control modes includes
        permitting switching from the stop mode to the user operation mode in response to acquisition of a permission regarding the switching from the stop mode to the user operation mode from the center when the external abnormality is not detected, and
        permitting switching from the stop mode to the user operation mode regardless of the acquisition of the permission from the center when the external abnormality is detected.

6. An autonomous travel device capable of communicating with a center and executing autonomous traveling, the autonomous travel device comprising a processor, wherein
    the processor is configured to carry out
        executing an autonomous travel mode in which the autonomous traveling of the autonomous travel device is executed,
        executing a stop mode in which movement of the autonomous travel device is restricted,
        executing a user operation mode in which restriction of movement of the autonomous travel device is released and a movement operation of the autonomous travel device by a user is accepted, determining whether to permit switching of control modes including the autonomous travel mode, the stop mode and the user operation mode, and detecting an external abnormality that occurs outside the autonomous travel device, and the determining whether to permit the switching of the control modes includes permitting switching from the stop mode to the user operation mode in response to acquisition of a permission regarding the switching from the stop mode to the user operation mode from the center when the external abnormality is not detected, and permitting switching from the stop mode to the user operation mode regardless of the acquisition of the permission from the center when the external abnormality is detected.

7. An autonomous travel control method executed by a processor for controlling an autonomous travel device, the autonomous travel device being capable of communicating with a center and executing autonomous traveling, the method comprising:

executing an autonomous travel mode in which the autonomous traveling of the autonomous travel device is executed;

executing a stop mode in which movement of the autonomous travel device is restricted;

executing a user operation mode in which restriction of movement of the autonomous travel device is released and a movement operation of the autonomous travel device by a user is accepted;

determining whether to permit switching of control modes including the autonomous travel mode, the stop mode and the user operation mode; and detecting an external abnormality that occurs outside the autonomous travel device, wherein the determining whether to permit the switching of the control modes includes permitting switching from the stop mode to the user operation mode in response to acquisition of a permission regarding the switching from the stop mode to the user operation mode from the center when the external abnormality is not detected, and permitting switching from the stop mode to the user operation mode regardless of the acquisition of the permission from the center when the external abnormality is detected.

8. A non-transitory computer readable medium storing a autonomous travel control program stored in a storage medium and including instructions to be executed by a processor for controlling an autonomous travel device, the autonomous travel device being capable of communicating with a center and executing autonomous traveling, the instructions being configured to, when executed by the processor, cause the processor to carry out:

executing an autonomous travel mode in which the autonomous traveling of the autonomous travel device is executed;

executing a stop mode in which movement of the autonomous travel device is restricted;

executing a user operation mode in which restriction of movement of the autonomous travel device is released and a movement operation of the autonomous travel device by a user is accepted;

determining whether to permit switching of control modes including the autonomous travel mode, the stop mode and the user operation mode; and detecting an external abnormality that occurs outside the autonomous travel device, wherein the determining whether to permit the switching of the control modes includes permitting switching from the stop mode to the user operation mode in response to acquisition of a permission regarding the switching from the stop mode to the user operation mode from the center when the external abnormality is not detected, and permitting switching from the stop mode to the user operation mode regardless of the acquisition of the permission from the center when the external abnormality is detected.

* * * * *